Dec. 20, 1932. G. L. R. J. MESSIER Re. 18,696

PNEUMATIC SUSPENSION FOR AIRPLANES

Original Filed Sept. 7, 1928

GEORGE LOUIS RENÉ JEAN MESSIER
INVENTOR

BY Haseltine, Lake & Co.
ATTORNEYS

Reissued Dec. 20, 1932

Re. 18,696

UNITED STATES PATENT OFFICE

GEORGE LOUIS RENÉ JEAN MESSIER, OF MONTROUGE, FRANCE

PNEUMATIC SUSPENSION FOR AIRPLANES

Original No. 1,780,531, dated November 4, 1930, Serial No. 304,433, filed September 7, 1928, and in France September 22, 1927. Application for reissue filed November 3, 1932. Serial No. 640,984.

When an airplane lands it has a certain vertical speed.

The resilient system of the landing chassis must absorb the corresponding vis viva.

The maximum beating or flapping being limited by the very constitution of the landing chassis and the latter being able to support only a predetermined maximum static overload, it will be immediately understood that, for absorbing the greatest possible vis viva, it is necessary that the opposed resilient resistance should be approximately constant and in the neighbourhood of the maximum admissible static overload.

If use is made of a suspension by means of rubber, metal spring or compressed air, the overload curve in function of the collapsings is, either an inclined straight line, or a curve of a hyperbolic nature. In both cases, the optima conditions above defined are far from being obtained.

The present invention has for object an improved suspension system for airplanes, allowing the said optima conditions to be approached.

Figure 1:
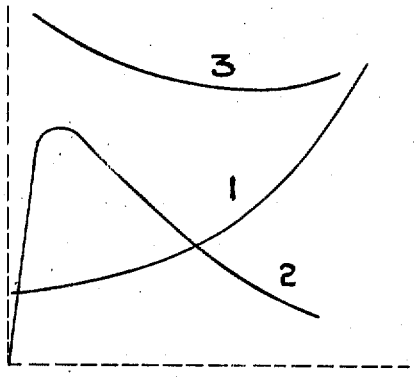

It is based on the combination of a resilient braking by compression of air, and of a hydraulic braking by delivery of liquid through orifices of reduced cross section, this cross section being either constant, or variable according to the position of the piston and the direction in which it moves, in such a manner (see Fig. 1):

1. As to superpose on a curve of pneumatic braking of rising hyperbolic nature (1), a curve of hydraulic braking (2), of descending nature, so that the resulting curve (3) approaches a horizontal straight line. In Fig. 1, the abscissæ correspond to the beating of flapping sags, the ordinates represent the forces opposed to the bending. The curve (2) is variable according to the speed of the airplane at the time of contact with the ground.

2. As to permit of braking the rebounding of the airplane, that is to say, the relaxation of the resilient systems, in an independent manner.

In the following description, it will be assumed that the gas employed is a compressed gas. But it must be understood that any gas or fluid may be used, carbonic acid for instance, under a free form or enclosed in a solid, spongy rubber for instance.

In the case of an airplane provided with two wheels and a tail skid, the suspension comprises:

(*a*) two suspension apparatus arranged adjacent to each wheel, at the front;

(*b*) a rear apparatus interposed between the tail skid and the fuselage.

Figure 2:
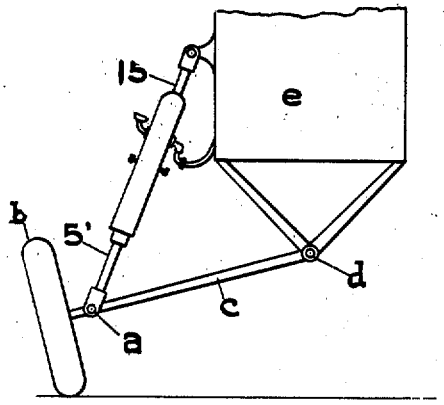
Figure 3:
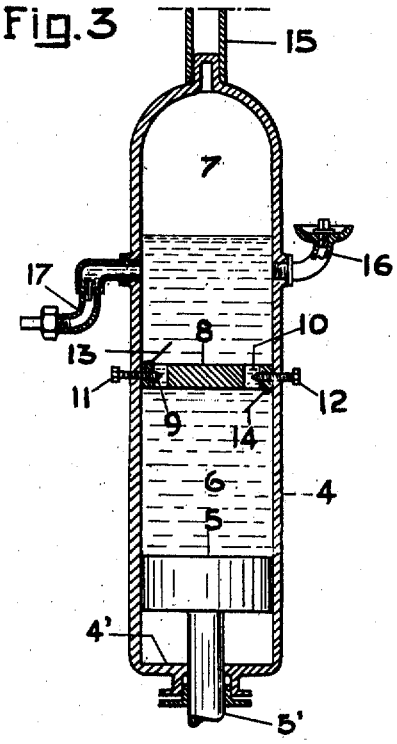
Figure 4:
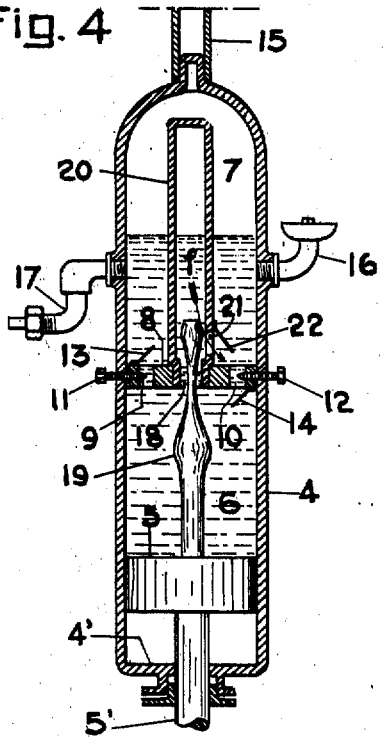

Figure 2 diagrammatically illustrates an example of such a device applied to a wheel;

Figure 3 shows in section, on an enlarged scale, the suspension apparatus in accordance with the invention; and Figure 4 illustrates a modification in which the section offered to the liquid is variable.

Each apparatus, mounted vertically or with a slight inclination to the vertical, comprises a cylinder 4 in which a piston 5 can move; on the latter is arranged a body of liquid 6 on the top of which is a compressed air cushion 7. The rod 5′ of the piston is pivoted at *a* on the landing chassis carrying the wheel *b* of the airplane, the helf-axle *o* is pivoted at *d* under the fuselage *e*.

A diaphragm 8 secured to the cylinder separates in two parts the body of liquid; it is perforated with two orifices 9, 10; the cross section of these orifices can be regulated from the exterior by means of controlling screws 11, 12, for instance; two flap-valves 13, 14, arranged in reverse direction, compel the liquid to pass through one of the orifices, 9, when the piston moves upwards, and through the other orifice 10, when the piston moves downwards. The apparatus comprises also a tube 15 for securing the cylinder, and filling up orifices 16 and 17 for the liquid and the compressed fluid.

It will then be understood that, upon landing, the vertical speed of the airplane being a maximum upon contact with the ground and subsequently decreasing progressively, the stress of hydraulic braking, approximately proportional to the square of the speed of flow of the liquid through the orifice 9, also decreases from a maximum.

A resulting curve similar to the curve (3) of Fig. 1 is thus obtained.

Both orifices can be supplemented by a third orifice, the cross section of which varies according to the position of the piston, in such a manner, for instance, as to again increase the value of the hydraulic braking during the last period of the upstroke of the piston.

For that purpose (Fig. 4), the diaphragm 8 is perforated with a third orifice 18, through which a rod 19 of variable cross section, integral with the piston 5, passes.

In order that this orifice may serve in one direction only, that of the arrow *f*, it is surmounted by a tube 20 closed at its upper part and perforated with a side orifice 21, provided with a flap-valve 22 so arranged as to prevent the passage of the liquid in the reverse direction.

The apparatus can be adjusted in two different manners:

1.—Under the normal load, the piston is at a certain distance from the lower bottom 4′ of the cylinder, so that the beating or flapping of the wheels may also take place downwardly;

2.—Under the normal load the pressure of the compressed fluid is regulated to such a value that the piston rests on the lower bottom.

In the latter case, as well as in the first one, when the airplane is in flight, the fluid-tightness of the piston can be completed by a packing, made of metal, fibre or any other material, on which the piston rests.

What I claim is:—

1. In a pneumatic suspension for the landing gear of airplanes, in combination, a cylinder pivotally attached to said airplane, a piston pivoted on the landing gear and contained in said cylinder, a volume of gas in said cylinder, a volume of liquid in said cylinder, a diaphragm centrally positioned in said cylinder below the level of said liquid, said diaphragm being provided with a central orifice and intermediate orifices, a rod having a restricted portion, integral with said piston and passing through said central orifice, a closed tube mounted on said diaphragm over said central orifice being provided with a side orifice and a flap valve covering said side orifice when said piston descends.

2. In a pneumatic suspension for the landing gear of airplanes, in combination, a cylinder pivotally attached to said airplane, a piston pivoted on the landing gear and contained in said cylinder, a volume of gas in said cylinder, a volume of liquid in said cylinder, a diaphragm centrally positioned in said cylinder below the level of said liquid, said diaphragm being provided with a central orifice and intermediate orifices, means for adjustably varying the area of said intermediate orifices, flap valves hingedly positioned above and below said intermediate orifices, a rod having a restricted portion, integral with said piston and passing through said central orifice, a closed tube mounted on said diaphragm over said central orifice being provided with side orifice and a flap valve covering said side orifice when said piston descends.

3. In a pneumatic suspension for the landing gear of airplanes, in combination, a cylinder pivotally attached to said airplane, a piston pivoted on the landing gear and contained in said cylinder, a volume of gas in said cylinder, a volume of liquid in said cylinder, a diaphragm centrally positioned in said cylinder below the level of said liquid, said diaphragm being provided with a central orifice and intermediate orifices, a rod having a restricted portion, integral with said piston and passing through said central orifice, a closed tube mounted on said diaphragm over said central orifice being provided with a side orifice and a valve covering said side orifice when said piston descends.

4. In a pneumatic suspension for the landing gear of airplanes, in combination, a cylinder pivotally attached to said airplane, a piston pivoted on the landing gear and contained in said cylinder, a volume of gas in said cylinder, a volume of liquid in said cylinder, a diaphragm centrally positioned in said cylinder below the level of said liquid, said diaphragm being provided with a central orifice and intermediate orifices, means for adjustably varying the area of said intermediate orifices, valves positioned above and below said intermediate orifices, a rod having a restricted portion, integral with said piston and passing through said central orifice, a closed tube mounted on said diaphragm over said central orifice being provided with a side orifice and a valve covering said side orifice when said piston descends.

GEORGE LOUIS RENÉ JEAN MESSIER.